E. & T. J. Lobdell,
Grapple.
Nº 362.    Patented Aug. 18, 1837.
4 Sheets, Sheet 1.
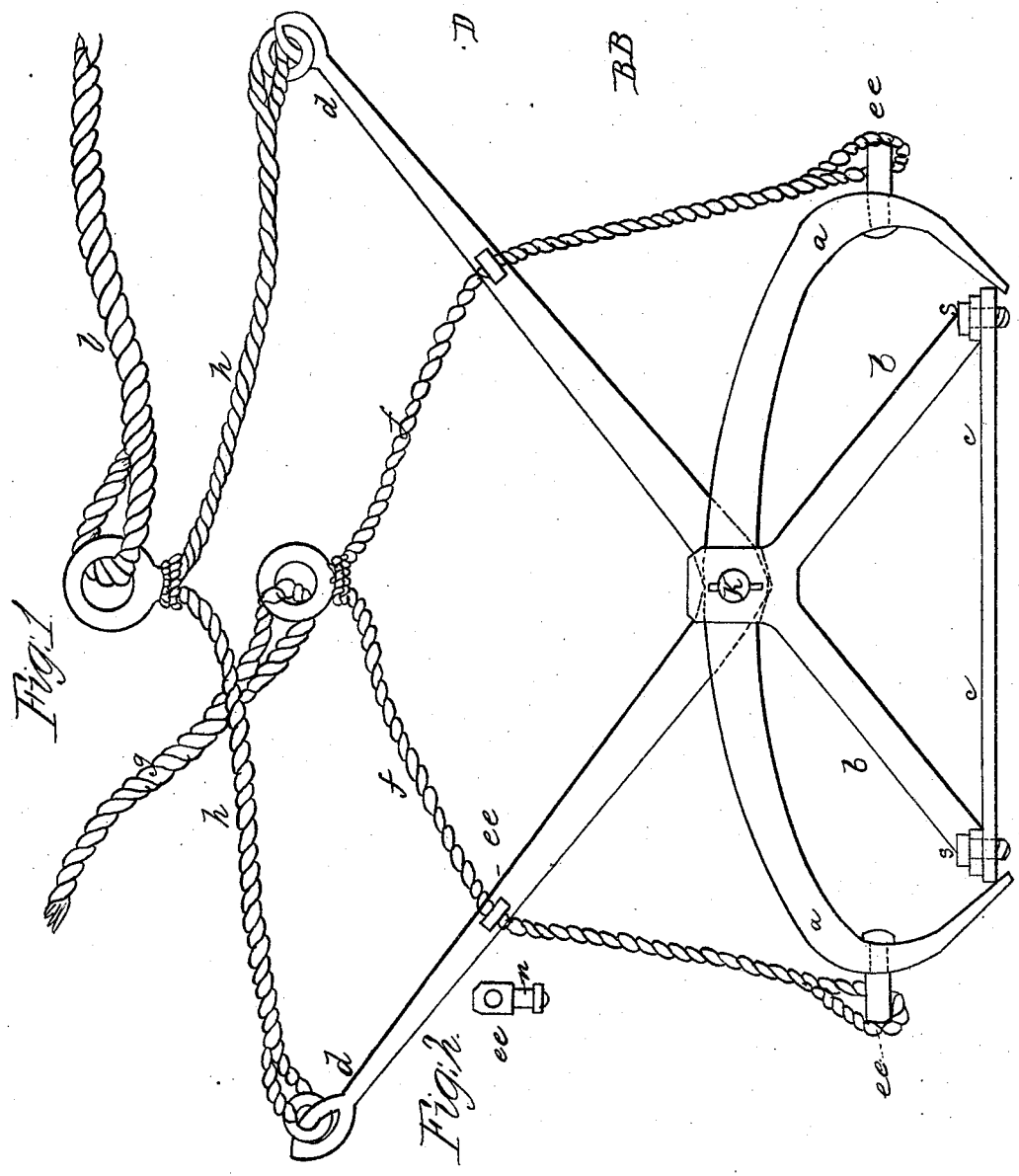

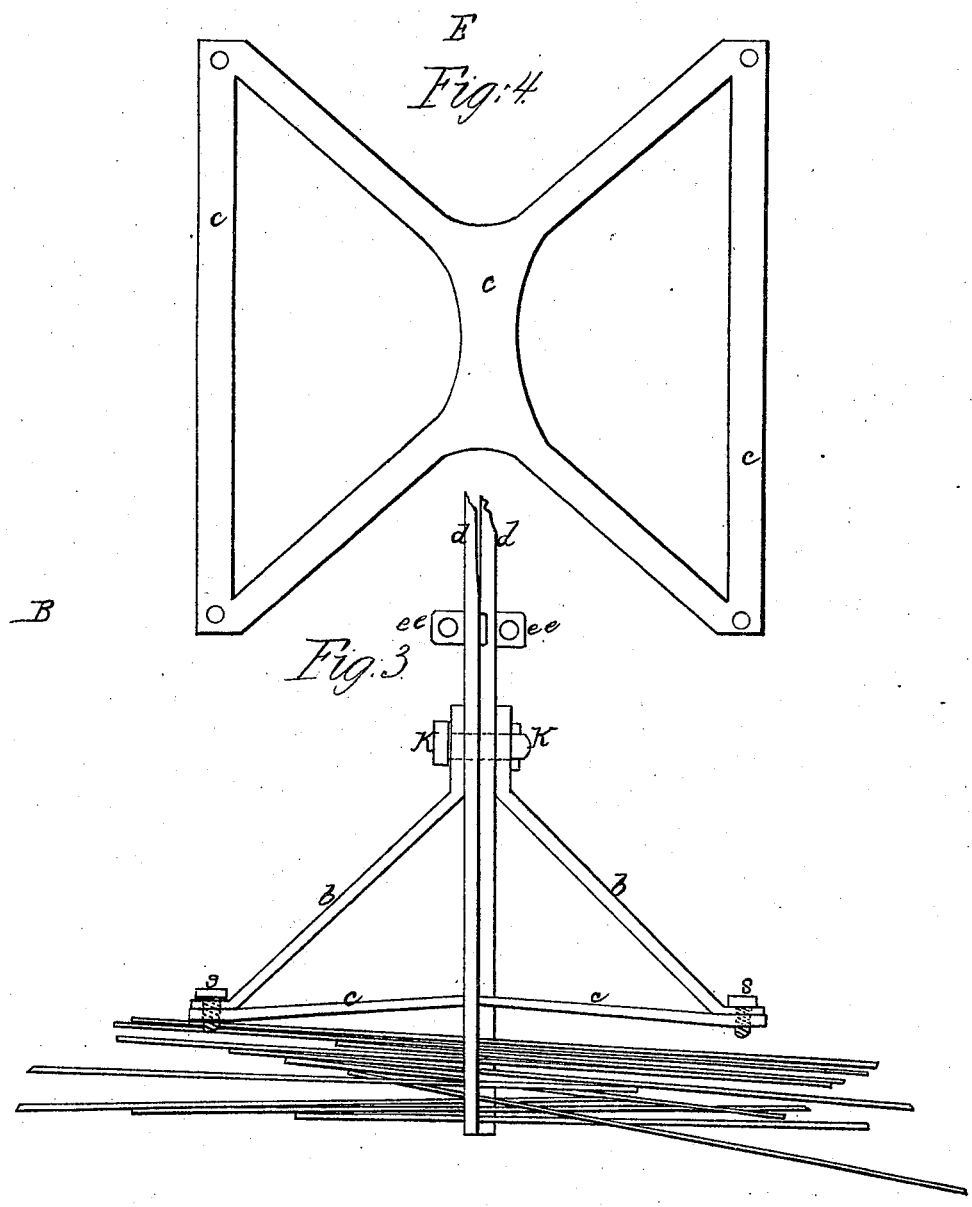

E & T. J. Lobdell,
Grapple.
Nº 362.    Patented Aug. 18, 1837.
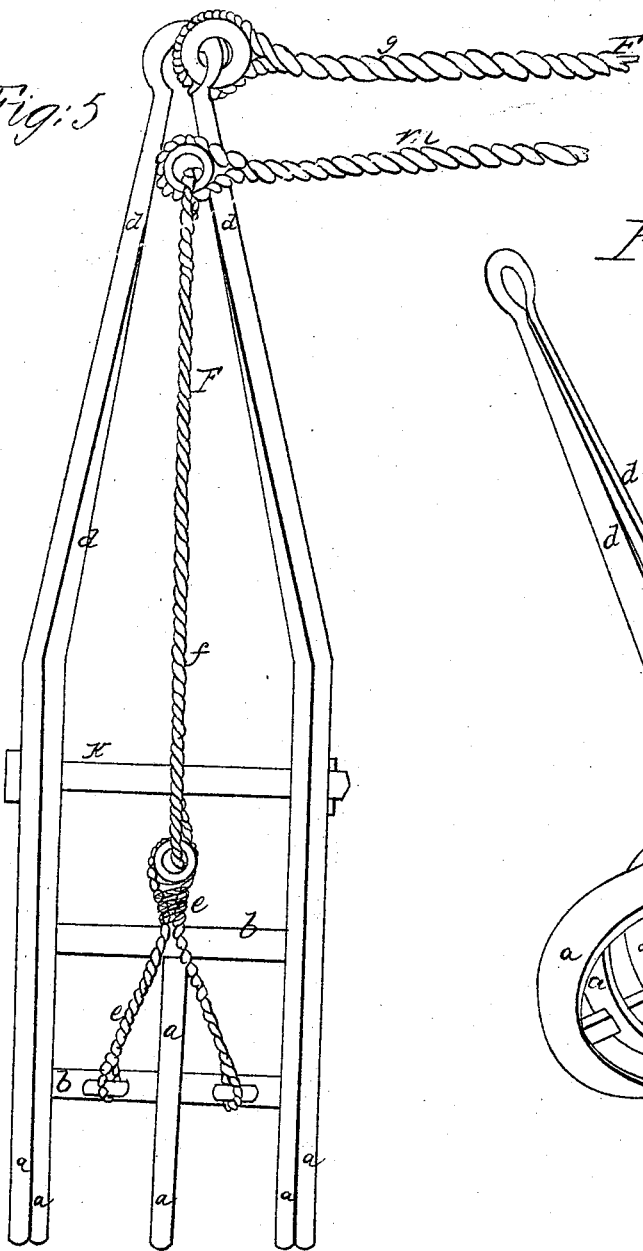
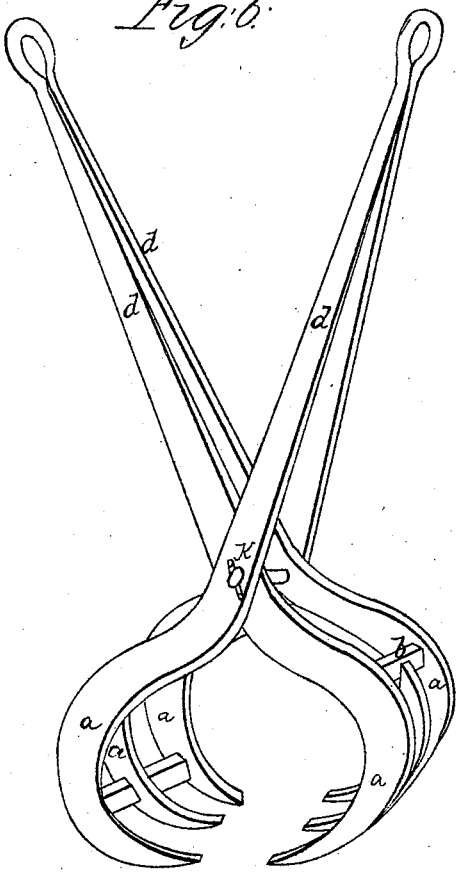

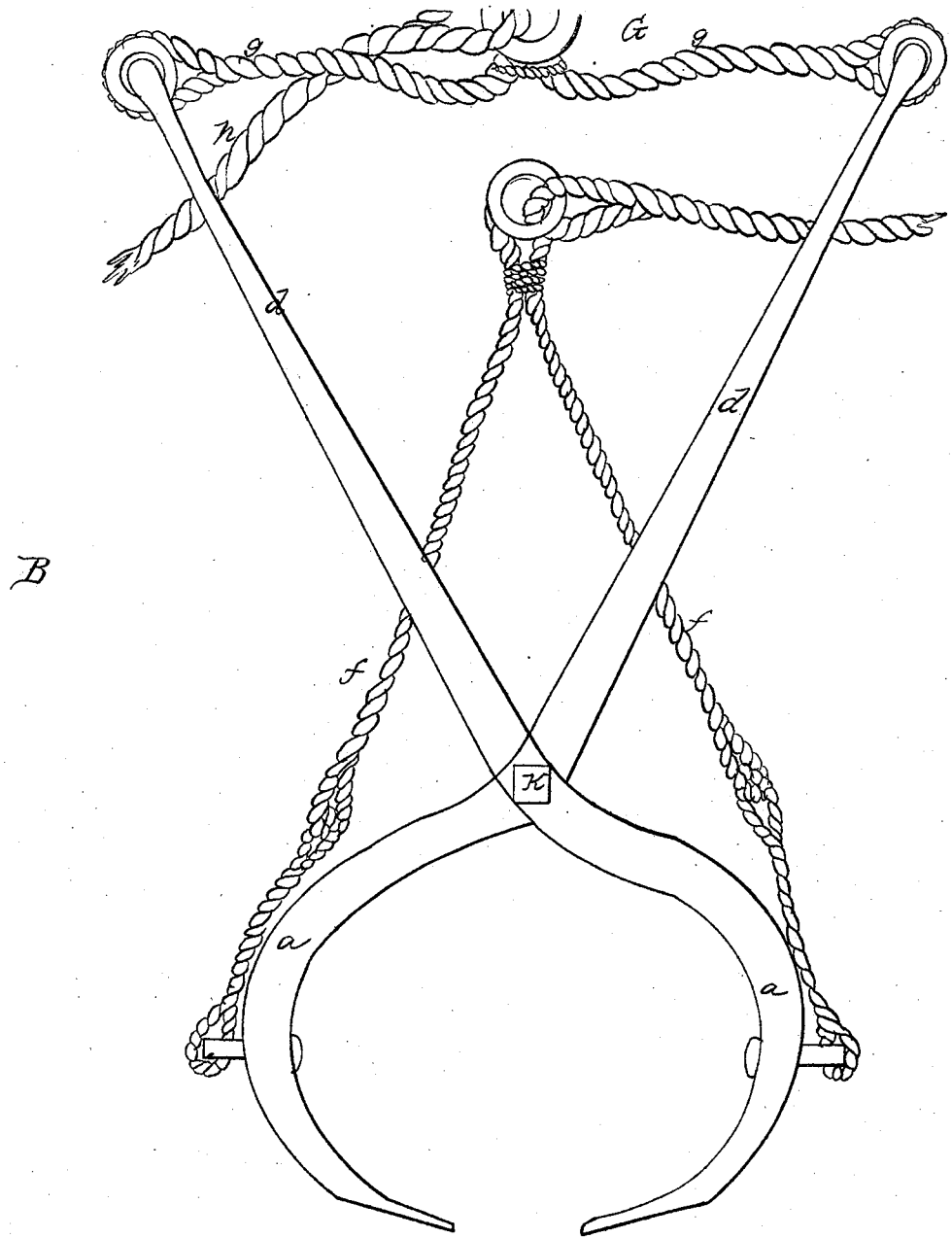

UNITED STATES PATENT OFFICE.

EBENR. LOBDELL, OF PLYMPTON, AND THOS. J. LOBDELL, OF BOSTON, MASSACHUSETTS.

TONGS OR GRAPPLING IRONS FOR RAISING BODIES FROM UNDER WATER.

Specification of Letters Patent No. 362, dated August 18, 1837.

*To all whom it may concern:*

Be it known that we, the undersigned, EBENEZER LOBDELL, of Plympton, in the county of Plymouth, and THS. J. LOBDELL, of Boston, in the county of Suffolk, all in the State of Massachusetts, have invented or discovered a new and useful Improvement on tongs, dogs, or grappling-irons heretofore in use for the purpose of raising light or heavy bodies from under water, and which improvement we call "Lobdell's tongs or grappling-irons," and that the annexed instrument of writing contains a full and exact description thereof.

Description of Lobdell's tongs or grappling irons used for the recovery of property lost by shipwreck; for clearing out the beds of rivers, and for removing rocks and other obstructions from under any depth of water in which soundings can be had.

The tongs themselves do not vary essentially from the tongs, dogs or grappling-irons heretofore in common use by lumbermen, fishermen and others; but the application of them to the purposes above named, as well as to the removal of all kinds of stones, or other obstructions to submarine works, is presumed to be a new discovery; as is also the improvements by which they are opened and shut, and also the wings or bearing frames by which they are capable of retaining in their grasp bars of iron and other articles.

Plan 1.—Figure 1. is a view of one set of tongs, with the wings or bearing frames attached thereto. Tongs of this construction are used for bringing up from the bottom bars of iron, or any other lengthy articles which could not be retained and brought up by a pair of common tongs without the addition of the wings or bearing frames. Fig. 2. gives a view of the swivel-eyes *e, e,* through which the bridle ropes *f, f,* pass; these swivel-eyes pass entirely through the arms of the tongs, as shown in Fig. 3. Plan 2, and play freely round on their necks *n* and thus accommodate themselves to the strain of the bridle ropes. They are kept in their places by a nut, or burr, on the end of the neck, as shown in the figure. The bridle-ropes *f, f,* and the back-line *g* serve for opening the tongs when under water, in fact the tongs are usually lowered into the water by this back-line *g,* and consequently they descend already open as represented in Plan 1.

Plan 2.—Fig. 3 gives a view of the lower part of the tongs (the upper parts being represented as broken off) with the wings or bearing frames attached, as they would be seen from the side B B of Plan 1. It will be perceived that the wings or bearing frames are attached to the tongs by the connecting pivot K, which also forms the joint of the tongs. This figure represents the tongs as loaded with a quantity of bar iron which is kept from falling through them, or out of their control, in consequence of the bars being supported by their own gravity against the bottom C of the bearing frames *b, c.* The load being unequally poised the longest or heaviest end of each bar bears down upon the tongs, while the shortest and lightest end is pressed upward against the bottom C of the bearing frame, and is thus prevented from falling out of the grasp of the tongs, while they are kept closed by the strain on the bridle and fall *n* and *l,* Plan 1, which serve to bring the load from the bottom, and to keep the tongs shut up until they are taken, with their load, into the vessel which conducts the operation. Fig. 4 shows the shape of the bottom part C of the wings or bearing frame. This is made of strong iron, and to it the supports, or braces, *b, b,* Fig. 3, are firmly screwed or bolted on each side of the tongs, as is shown in Fig. 3 at S, S. In all cases the tongs and wings or bearing frames are to be made wholly of wrought iron, and of such size and strength as the work they are intended to perform would naturally require.

Plans 3 and 4 represent a set of tongs calculated to raise stones, coal or other articles of irregular shape and size, which from their nature could not be operated upon by the other set of tongs. These are made with two, three or more prongs to each arm, as shown in Fig. 6. Plan 4 gives a view of the tongs and bridle-ropes which conduct the process of opening and shutting when under water, and the general operations when in use. Fig. 5 is a view of the same taken from the side B of Pl. 4. In each plan *a* represents the prongs or jaws, of which there are two, three or more, as the case may require; *d* the arms; *b* the supports to keep the prongs duly seprated; K the pivot which connects the two arms, or branches of the tongs together; *e* and *f* and *m* the bridles and backlines for lowering the tongs and opening them when under water; g and h the bridle and fall for shutting them; keeping them closed and hoisting them, with their load, out of the water. Fig. 6 gives a view of a pair of three pronged tongs without the bridle ropes, &c.

When dollars or other small articles are to be sought for the lower exteremities, or jaws of the tongs, as well as the sides, must be covered with sheet-iron or some other substance adapted to the purpose so as to form, as it were, a pair of spoons or scoops, which when closed should retain the smallest objects; in this form they may be made useful in bringing up mud, sand, gravel, &c., for the purpose of deepening the beds or channels of rivers, creeks, &c.

What we claim as our invention, and wish to secure by Letters Patent is—

The wings or bearing frames, by which bars of iron, or other lengthy articles, are held in the grasp of the tongs, as is more particularly represented and described in the annexed documents.

EBENR. LOBDELL.
THOS. J. LOBDELL.

Witnesses:
E. COPELAND, Jr.,
E. THOS. LOBDELL.